(12) United States Patent
Credé

(10) Patent No.: US 12,036,621 B2
(45) Date of Patent: Jul. 16, 2024

(54) METHOD FOR JOINING HARD MATERIAL BODIES TO TEETH OF A SAW BLADE

(71) Applicant: Credé Vermögensverwaltungs—GmbH + Co. KG, Pforzheim (DE)

(72) Inventor: Marcel Credé, Pforzheim (DE)

(73) Assignee: Credé Vermögensverwaltungs- GmbH + Co. KG, Pforzheim (DE)

( * ) Notice: Subject to any disclaimer, the term of this patent is extended or adjusted under 35 U.S.C. 154(b) by 58 days.

(21) Appl. No.: 17/268,631

(22) PCT Filed: Aug. 15, 2019

(86) PCT No.: PCT/EP2019/071906
§ 371 (c)(1),
(2) Date: Feb. 16, 2021

(87) PCT Pub. No.: WO2020/038818
PCT Pub. Date: Feb. 27, 2020

(65) Prior Publication Data
US 2021/0354220 A1 Nov. 18, 2021

(30) Foreign Application Priority Data
Aug. 20, 2018 (DE) ...................... 10 2018 120 243.1

(51) Int. Cl.
*B23D 61/04* (2006.01)
*B23D 65/00* (2006.01)
(52) U.S. Cl.
CPC ............. *B23D 61/04* (2013.01); *B23D 65/00* (2013.01)
(58) Field of Classification Search
CPC ........ B23D 65/00; B23D 65/02; B23D 65/04; B23D 63/20; B23D 63/201–208; B23K 31/025; B23K 11/002
(Continued)

(56) References Cited

U.S. PATENT DOCUMENTS 3,072,470 A * 1/1963 Hinshaw ................ B28D 1/121
51/293
3,099,738 A * 7/1963 Sadowski ............ B23D 63/003
219/85.14
(Continued)

FOREIGN PATENT DOCUMENTS

CN 202079511 U 12/2011
CN 204504387 U 7/2015
(Continued)

OTHER PUBLICATIONS

DE-202006011952-U1 English translation; Dec. 2006 Tigra Hartstoff GMBH B23D61/04.*
(Continued)

*Primary Examiner* — Laura M Lee
(74) *Attorney, Agent, or Firm* — George R. McGuire; Bond Schoeneck & King PLLC

(57) ABSTRACT

The invention relates to a method for joining hard material bodies to teeth of a saw blade, in particular of a band saw blade or circular saw blade, wherein each tooth has a tooth face and a tooth back, and the method includes steps of bringing each tooth of the saw blade into a working region, guiding each hard material body toward the tooth located in the working region, advancing a joining device into the working region, joining the hard material body to the tooth located in the working region, and withdrawing the joining device out of the working region. According to the invention, each hard material body is joined to the tooth back of each tooth.

9 Claims, 3 Drawing Sheets

(58) Field of Classification Search
USPC .................................................. 76/25.1, 112
See application file for complete search history.

(56) References Cited

U.S. PATENT DOCUMENTS

| | | | | |
|---|---|---|---|---|
| 3,718,799 | A * | 2/1973 | Sawamura | B23K 31/025 219/80 |
| 4,188,524 | A * | 2/1980 | Trinchera | B23K 31/025 219/77 |
| 4,727,778 | A * | 3/1988 | Omi | B28D 1/121 76/115 |
| 4,786,779 | A * | 11/1988 | Fushimi | B23D 65/00 219/86.7 |
| 4,864,896 | A * | 9/1989 | Pfaltzgraff | B23K 31/025 76/112 |
| 5,295,417 | A * | 3/1994 | Beck | C21D 9/24 76/112 |
| 5,783,794 | A * | 7/1998 | Oikawa | B23K 11/115 219/94 |
| 8,495,942 | B2 * | 7/2013 | Rattunde | B23D 65/00 76/112 |
| 9,427,846 | B2 * | 8/2016 | Aoki | B24D 5/123 |
| 10,500,679 | B2 * | 12/2019 | Wang | B23K 11/30 |
| 10,661,377 | B2 * | 5/2020 | Kundrat | B23K 11/002 |
| 10,926,359 | B2 * | 2/2021 | Huang | B23B 27/18 |
| 2009/0126205 | A1 * | 5/2009 | Kullmann | B23D 61/121 30/355 |
| 2010/0126326 | A1 * | 5/2010 | Cloutier | B23D 61/04 83/835 |
| 2016/0082534 | A1 * | 3/2016 | Fujiwara | B23D 61/04 76/112 |
| 2020/0223016 | A1 * | 7/2020 | Credé | B23D 63/06 |
| 2021/0170531 | A1 * | 6/2021 | Crede | B23K 31/025 |

FOREIGN PATENT DOCUMENTS

| | | | | |
|---|---|---|---|---|
| DE | 10040493 | A1 | 3/2002 | |
| DE | 202006011952 | U1 * | 12/2006 | ............. B23D 61/04 |
| DE | 102007057880 | A1 * | 6/2009 | ........... B23K 11/002 |
| DE | 102007057880 | A1 | 6/2009 | |
| EP | 1029624 | A2 * | 8/2000 | ............. B23D 61/04 |
| FR | 2473375 | A1 | 7/1981 | |
| JP | H05345220 | A | 12/1993 | |
| WO | 9219408 | A1 | 11/1992 | |
| WO | 9426450 | A1 | 11/1994 | |
| WO | 0119578 | A1 | 3/2001 | |
| WO | 2015140345 | A1 | 9/2015 | |

OTHER PUBLICATIONS

WO9426450 English Translation ; Katz Otto; Nov. 1994; B23D61/021.*

International Search Report Form PCT/ISA/210, and Written Opinion Form PCT/ISA/237, International Application No. PCT/EP2019/071906 pp. 1-14, International Filing Date Aug. 15, 2019 mailing date of search report Oct. 24, 2019.

* cited by examiner

METHOD FOR JOINING HARD MATERIAL BODIES TO TEETH OF A SAW BLADE

CROSS-REFERENCES TO RELATED APPLICATIONS

This is a National Stage Application, filed under 35 U.S.C. 371, of International Patent Application No. PCT/EP2019/071906, filed on Aug. 15, 2019, which is based on and claims priority to German Patent Application No. 10 2018 120 243.1 filed on Aug. 20, 2018, the disclosure of each of which is incorporated herein by reference in its entirety.

BACKGROUND

The invention relates to a method for joining hard material bodies to teeth of a saw blade, in particular of a band saw blade or circular saw blade, each tooth having a tooth face and a tooth back, and the method comprising the following steps:
bringing each tooth of the saw blade into a working region;
guiding each hard material body toward the tooth located in the working region;
advancing a joining device into the working region;
joining the hard material body to the tooth located in the working region;
and withdrawing the joining device from the working region.

The invention further relates to an apparatus for performing the method, a saw blade comprising teeth for attachment to hard material bodies, and a saw blade having hard material bodies attached to the teeth.

In the case of the teeth of the saw blade, the tooth face is formed on a front side of each tooth in the cutting direction and the tooth back is formed on a rear side of the tooth facing away from the cutting direction; the cutting direction is understood to be the direction in which the saw blade is moved relative to a workpiece to be sawed during a sawing process. Each tooth therefore contacts a workpiece to be cut with the face first.

A hard material body is understood here to be a body of any geometry, in particular a sphere, cylinder, or plate shape, made of a hard material, in particular hard metal, cermet, cutting ceramic or diamond. The hard material body has, for example, a height of from 1 mm to 4.5 mm, preferably 1.5 mm to 3.5 mm, a width of from 1 mm to 6 mm, preferably 1.5 mm to 3.5 mm, and a length of from 2 mm to 6 mm, preferably 3 mm to 4.5 mm.

Methods for joining hard material bodies to teeth of saw blades are already known from the prior art. The hard material bodies are usually attached to the tooth face of the teeth of the saw blade, i.e., to the side facing in the cutting direction, and then, after being joined, are brought into the desired shape by means of further processing steps, for example by grinding, such that a cutting geometry is then formed on the tooth face.

The space available on the tooth face for welding on the hard material body is limited by the height of the teeth and by the distance from the preceding tooth in the cutting direction.

The invention therefore has the object of providing a method for joining hard material bodies to teeth of a saw blade, by means of which the disadvantages of the methods known from the prior art can be overcome.

SUMMARY OF THE INVENTION

According to the invention, each hard material body is joined to the tooth back of each tooth. The tooth back is formed on the side of the tooth facing away from the cutting direction. The hard material body is joined to the side of the tooth facing away from the cutting direction.

In principle, various joining methods are conceivable for joining the hard material bodies to the teeth of the saw blade. It can prove advantageous that the joining device is a welding device having a welding electrode, and each hard material body and each tooth are joined to one another by welding, in particular resistance welding. In this case, the welding objects are melted at the welding point by supplying energy and are typically welded under the action of a pressing force by solidifying the melt.

In a development of this inventive concept, it has proven advantageous that in a step preceding the joining process, at least one welding introduction attachment protruding from a joining surface of the tooth is formed on the tooth back of each tooth of the saw, the welding introduction attachment being melted or melted down when a welding pulse is introduced.

The welding introduction attachment is, for example, conical, hemispherical, semicylindrical, teardrop-shaped, pea-shaped, or pyramid-shaped, protruding from the joining surface of the tooth. The height or length of the welding introduction attachment is 0.02 mm to 2 mm, preferably 0.05 mm to 0.8 mm, in particular 0.1 mm to 0.8 mm, such that the welding introduction attachment protrudes 0.02 mm to 2 mm, preferably 0.05 mm to 0.8 mm, in particular 0.1 mm to 0.8 mm, from the joining surface. The width of the welding introduction attachment is, for example, 0.1 mm to 3 mm, preferably 0.4 mm to 2 mm.

By providing the welding introduction attachment, when the hard material body is guided toward the tooth, a small-area, point- or line-shaped support is provided between the tooth and the hard material body, which are thus kept at a distance from one another approximately equal to the height of the welding introduction attachment prior to welding. Due to the small area of this support, there is relatively high electrical contact resistance which is favorable for the heat input into the workpieces due to introducing a welding pulse. The welding introduction attachment is melted more and more during the welding pulses and melts together with the pressed hard material body in the region of the joining surface.

In a development of this inventive concept, it is conceivable that in a step preceding the joining process, at least one welding introduction attachment protruding from a joining surface of the hard material body is formed on each hard material body, the welding introduction attachment being melted or melted down when a welding pulse is introduced. In particular, it is also conceivable that one or more welding introduction attachments are formed both on the joining surface of the tooth and on the joining surface of the hard material body.

The joining surface of the hard material body is understood to mean the surface of the hard material body which contacts the tooth after the hard material body has been joined. The welding introduction attachment is, for example, conical, hemispherical, semicylindrical, teardrop-shaped, pea-shaped, or pyramid-shaped, protruding from the joining surface of the hard material body. The height or length of the welding introduction attachment is 0.02 mm to 2 mm, preferably 0.05 mm to 0.8 mm, in particular 0.1 mm to 0.8 mm, such that the welding introduction attachment protrudes 0.02 mm to 2 mm, preferably 0.05 mm to 0.8 mm, in particular 0.1 mm to 0.8 mm, from the joining surface. The width of the welding introduction attachment is, for example, 0.1 mm to 3 mm, preferably 0.4 mm to 2 mm.

It proves to be particularly advantageous if the welding introduction attachment is elongate, in particular obliquely or orthogonally with respect to the plane of the saw blade, forming a kind of rib or projection. It can thus be produced in an economical manner in that a plurality of saw blades are arranged in parallel with one another and are then machined in a transverse direction.

Due to the geometry of the welding introduction attachment of the hard material body, when the hard material body is guided toward the tooth directly before the welding pulse is introduced, there is a small-area, point- or line-shaped support between the tooth and the hard material body. Due to the small area of this support, there is relatively high electrical contact resistance which is favorable for the heat input into the workpieces due to and when introducing a welding pulse. During the welding pulse, the welding introduction attachment is rapidly melted down and melts together with the pressed tooth in the region of the joining surface.

According to a further inventive concept, it proves advantageous if each hard material body is ground, in particular to its final shape, in a step preceding the joining process. This can be done at the manufacturer or supplier of the hard material body.

Grinding to its final shape is understood here to mean that a desired cutting geometry, for example a cutting edge, is formed on the hard material body such that no further grinding process is necessary after the joining process. Furthermore, with different types of saw blades it may sometimes be necessary to design individual teeth of a saw blade differently in a targeted manner. In this case, the final shapes of different hard material bodies can differ from one another. For example, saw blades having a pre-cutting and post-cutting geometry comprise teeth having cutting edges of different widths that are alternately attached one behind the other with successive teeth.

To improve the cutting and/or sliding properties, it can prove to be advantageous if the hard material body is coated in a further step preceding the joining process. The coating includes, for example, titanium carbide (TiC), titanium nitride (TiN), titanium carbonitride (TiCN) or aluminum oxide ($Al_2O_3$). It can be carried out using the PVD process or CVD process. In particular, it can prove to be advantageous that the hard material body is only partly coated, with no coating being provided in particular on the joining surface.

It can also prove to be advantageous that guiding each hard material body toward the tooth located in the working region comprises supplying and transferring each hard material body to the joining device by means of a supply device. The joining device, i.e., in particular a welding head or a welding electrode of a welding device, can then be advanced into the working region together with the hard material body transferred thereto and guided toward the tooth located there.

Supplying and transferring each hard material body by means of the supply device to the joining device advantageously comprises gripping each hard material body by means of a robot gripping device. In a development of this inventive concept, it has proven to be advantageous if the hard material bodies are provided in such a way that they can be gripped in a simple manner by means of the robot gripping device. For example, it is conceivable to hold the hard material bodies, in particular aligned depending on their geometry, for example lined up and/or stacked next to one another in a matrix-like manner. In particular, it may be advisable to keep the hard material bodies in a magazine or in a blister.

In this way it is possible, for example, to grasp already ground hard material bodies in a certain orientation and to transfer them to the joining device.

The invention also relates to an apparatus for performing the method described above, comprising a saw blade feed device for moving the saw blade in a feed direction such that each tooth of the saw blade can be brought into a working region of the apparatus, comprising a joining device which can be advanced into the working region and withdrawn again out of the working region, wherein the joining device is designed to join each hard material body to the tooth back of a relevant tooth.

The apparatus advantageously further comprises a supply device for supplying and transferring each hard material body to the joining device. In a development of this inventive concept, it has proven advantageous that the supply device comprises a robot gripping device for gripping each hard material body.

Preferably, the apparatus for performing the method also comprises a device for holding hard material bodies which are preferably fully ground to their final shape and optionally coated and preferably presented in an aligned manner and to which the supply device for supplying and transferring each hard material body has access to the joining device.

Furthermore, the subject matter of the invention is a saw blade, in particular a band saw blade or circular saw blade, comprising teeth for attachment to hard material bodies, each tooth comprising a tooth face and a tooth back, wherein at least one welding introduction attachment protruding from a joining surface is formed on the tooth back on the teeth.

The invention also relates to a saw blade, in particular a band saw blade or circular saw blade, comprising teeth and hard material bodies attached to the teeth, wherein the hard material bodies are attached to the tooth back of the teeth.

In a development of this inventive concept, it proves to be advantageous that the hard material bodies are ground to their final shape and optionally additionally coated before being joined to the teeth of the saw blade such that a saw blade having fully ground and optionally additionally coated hard material bodies is formed directly after the joining process.

BRIEF DESCRIPTION OF THE DRAWINGS

Further advantages, features and details of the invention can be found in the dependent claims and in the following description, in which a preferred embodiment is described in detail with reference to the drawings. The features shown in the drawings and mentioned in the claims and in the description may in each case be essential to the invention individually or in any desired combination. In the drawings:

DETAILED DESCRIPTION

Figure 1:
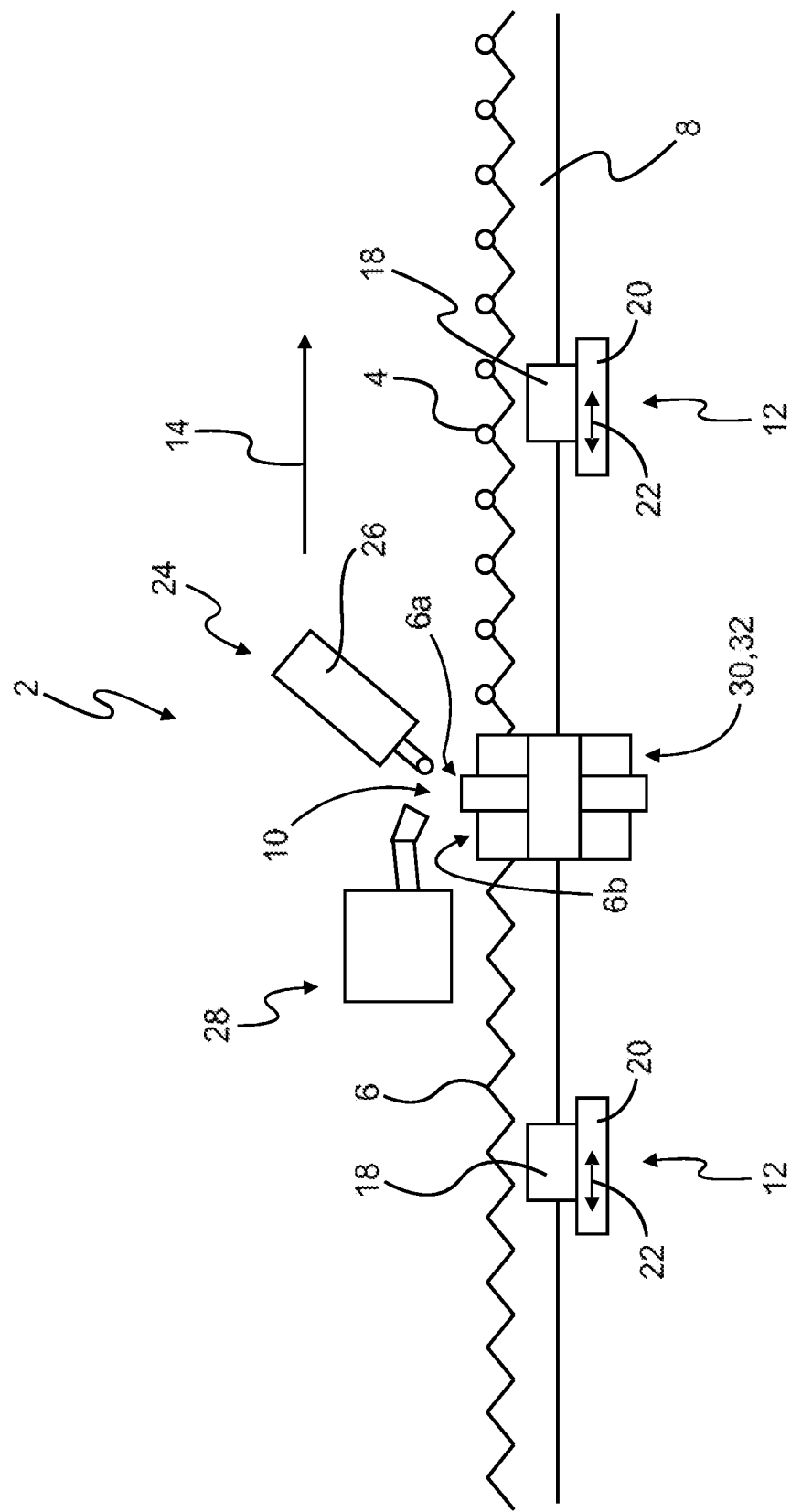
FIG. 1 shows a schematic view of the apparatus according to the invention with a saw blade from the side.
Figure 2:
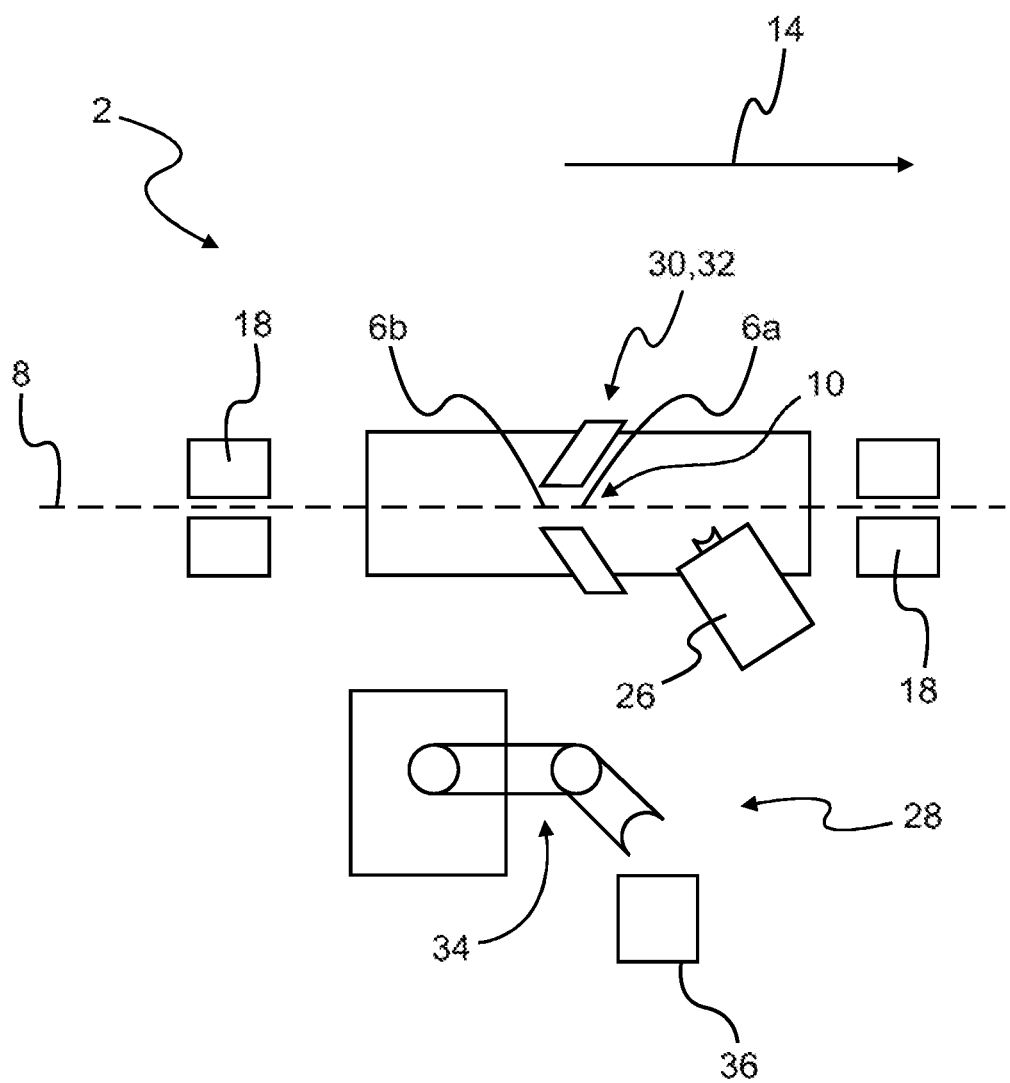
FIG. 2 shows a view of the apparatus according to the invention with a saw blade from above.

FIGS. 1 and 2 show an apparatus according to the invention, always denoted by the reference number 2, for joining hard material bodies 4 to teeth 6 of a saw blade 8 schematically in a side view and schematically viewed from above. In the embodiment shown, the saw blade 8 is a band saw blade. However, the invention can also be applied to circular saw blades. The saw blade 8, the teeth 6 of the saw blade 8 and the hard material bodies 4 attached to said teeth are only shown schematically in FIGS. 1 and 2.

Figure 3:
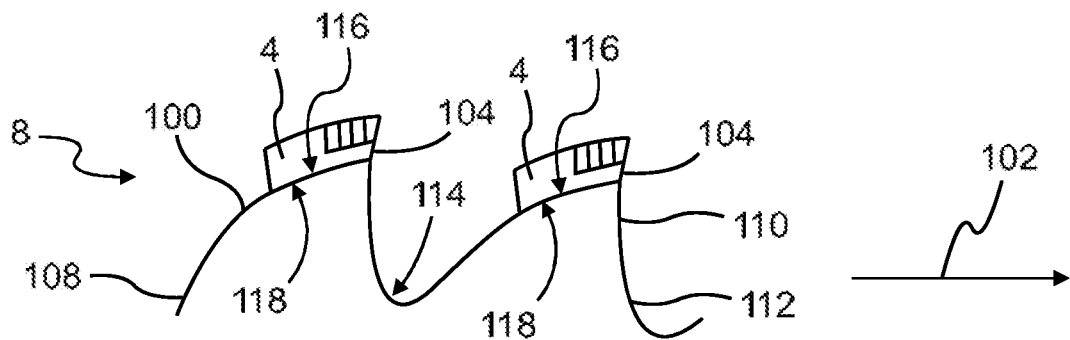
FIG. 3 shows a detailed view of a first embodiment of the saw blade according to the invention with a hard material body.
Figure 4:
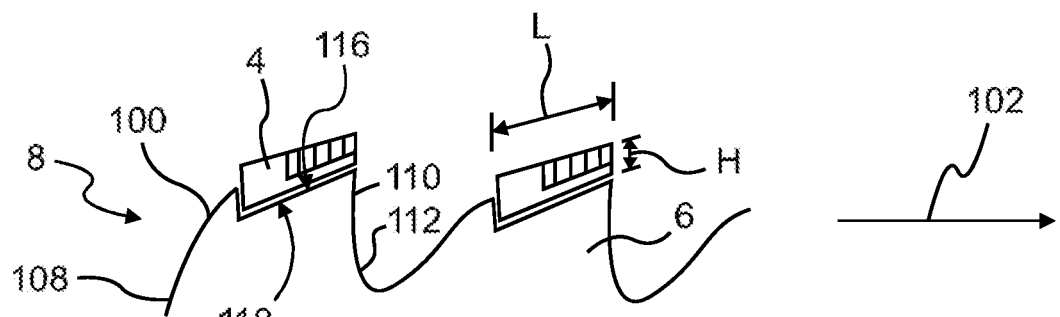
FIG. 4 shows a detailed view of a second embodiment of the saw blade according to the invention with a hard material body.

The apparatus 2 according to the invention is designed to attach the hard material bodies 4 to tooth backs 100 of the teeth of the saw blade 8. FIGS. 3 and 4 each show a detailed view of an embodiment of the saw blade 8 according to the invention having hard material bodies 4 attached to the tooth back 100.

The hard material body has, for example, a height H of from 1 mm to 4.5 mm, preferably 1.5 mm to 3.5 mm, a width of from 1 mm to 6 mm, preferably 1.5 mm to 3.5 mm, and a length L of from 2 mm to 6 mm, preferably 3 mm to 4.5 mm, with the width of the hard material body according to the embodiment shown in FIGS. 3 and 4 being the extension of the hard material body orthogonally with respect to the plane of the drawing.

According to the embodiments shown, the teeth 6 are aligned in the cutting direction 102, i.e., tips 104 of the teeth 6 point in the direction in which the saw blade 8 is to be moved relative to a workpiece (not shown) during the sawing process. The tooth back 100 is formed on a rear side 108 of the tooth 6 facing away from the cutting direction 102, while a tooth face 110 is formed on a front side 112 of the tooth 6 in the cutting direction 102.

According to the embodiments shown in FIGS. 3 to 6, the tooth face 110 extends substantially approximately perpendicularly with respect to the cutting direction 102. The tooth back 100 extends at least in portions in an arc shape as far as a base 114 of the following tooth 6. However, further configurations of the teeth 6, in particular teeth 6 having a tooth face 110 inclined in the cutting direction 102 or teeth 6 having a tooth face 110 inclined away from the cutting direction 102, are also conceivable.

According to FIGS. 3 and 4, each hard material body 4 is joined to the tooth back 100 of a relevant tooth 6, a joining surface 116 of the tooth 6 contacting a joining surface 118 of the hard material body. In FIG. 4, the joining surface 116 of the tooth is formed by a recess on the tooth back 100 that has an L-shaped profile in side view.

Figure 5:
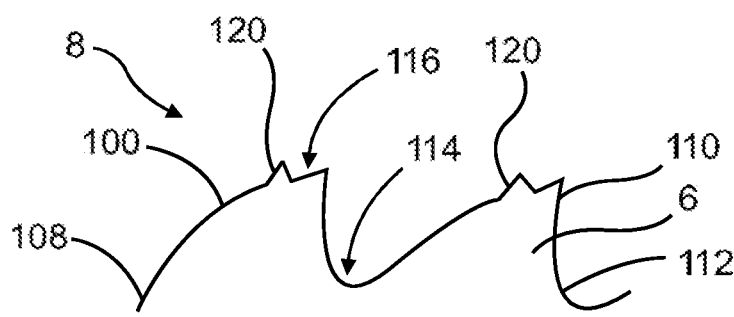
FIG. 5 shows an embodiment of the saw blade according to FIG. 3 without a hard material body.
Figure 6:
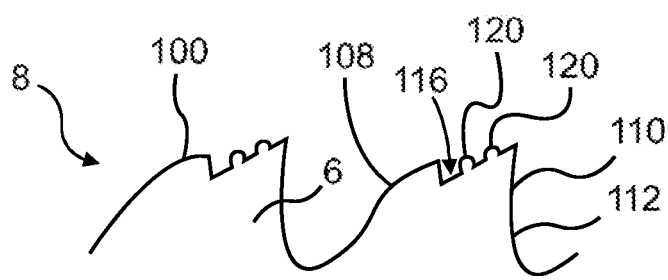
FIG. 6 shows an embodiment of the saw blade according to FIG. 4 without a hard material body.

FIGS. 5 and 6 each show a detailed view of an embodiment of the saw blade 8 according to the invention without the hard material body 4 attached to the teeth 6. According to the embodiment shown in FIG. 5, a welding introduction attachment 120 protruding from the joining surface 116 of the tooth 6 is formed on the tooth back 100 of each tooth 6 of the saw blade 8. According to the embodiment shown, the welding introduction attachment 120 is designed to taper to a point in side view. The welding introduction attachment 120 can also comprise any other geometry. For example, the welding introduction attachment 120 can be conical, hemispherical, semicylindrical, teardrop-shaped, pea-shaped, or pyramid-shaped, protruding from the joining surface 116 of the tooth 6.

Due to the geometry of the welding introduction attachment 120, when the hard material body 4 is guided toward the tooth 6, there is a small-area, point- or line-shaped support between the tooth 6 and the hard material body 4, which are thus kept at a distance from one another approximately equal to the height of the welding introduction attachment 120 prior to welding. Due to the small area of this support, there is relatively high electrical contact resistance which is favorable for the heat input into the teeth 6 and hard material bodies 4 due to introducing a welding pulse. The welding introduction attachment 120 is melted more and more during the welding pulses and melts together with the hard material body 4 in the region of the joining surfaces 116, 118.

In principle, more than one welding introduction attachment 120 protruding from the joining surface 116 can also be formed on each tooth 6. FIG. 6 shows, by way of example, two welding introduction attachments 120, protruding from the joining surface 116, on each tooth 6.

In principle, a welding introduction attachment protruding from the joining surface 118 can also be formed on each hard material body 4. This is not shown in the figures.

The hard material bodies 4 are joined to the teeth 6 of the saw blade 8 in a working region 10 of the apparatus 2. For this purpose, the saw blade 8 is moved in a feed direction 14 by means of a saw blade feed device 12 such that a relevant intended tooth 6a of the saw blade 8 can be brought into the working region 10 of the apparatus 2. According to the embodiment shown, the saw blade feed device 12 comprises gripping or clamping devices 18 for grasping the saw blade 8 that are mounted on feed carriages 20. The feed carriages 20 can be moved, for example by means of a drive, in the direction of the double arrow 22 in parallel with the feed direction 14. The drive is preferably an electric linear drive. Moving the saw blade 8 in the feed direction 14 is understood to mean a translational movement in the case of a band saw blade and naturally at least also a rotary movement in the case of a circular saw blade.

According to the embodiment shown, a joining device of the apparatus 2 for joining the hard material bodies 4 to the teeth 6 of the saw blade 8 is a resistance welding device 24 having a welding electrode 26 which can be advanced into the working region 10 and withdrawn again out of the working region 10 such that the hard material bodies 4 are attached to the tooth backs 100 of the teeth 6 of the saw blade 8 by means of resistance welding.

However, other joining methods, for example soldering, are also conceivable.

By means of a supply device 28, each hard material body 4 is supplied to the welding electrode 26 and transferred thereto. The structure and the mode of operation of the supply device 28 are explained below with reference to FIG. 2. The welding electrode 26, together with the hard material body 4 transferred thereto, is advanced into the working region 10 of the apparatus 2, and the hard material body 4 is guided toward the tooth 6a of the saw blade 4.

The apparatus 2 according to the embodiment shown further comprises a first centering device 30 for centering the saw blade 8 transversely to the feed direction 14 before the welding process and a second centering device 32 for centering each hard material body 4 transversely to the feed direction 14 before welding to the relevant intended tooth 6a of the saw blade 8 located in the target position. The first and second centering devices 30, 32 can be formed by any actuating elements. Furthermore, the centering devices 30, 32 can each comprise a gripping arrangement having gripping jaws which can be moved toward or away from one another transversely or obliquely with respect to the feed direction. The mode of operation and the structure of the first and second centering devices 30, 32 will not be discussed further at this point.

After the welding process has ended, the saw blade 8 is moved further in the feed direction 14 by means of the saw blade feed device 12 such that a subsequent tooth 6b can be brought into the target position.

The structure and mode of operation of the supply device 28 will now be explained below with reference to FIG. 2. Hard material bodies 4 are gripped by means of a robot gripping device 34 from a holding device 36 and transferred to the welding electrode 26. The holding device 36 is, for example, a plate on which the hard material bodies, in particular aligned depending on their geometry, are for example lined up and/or stacked next to one another in a matrix-like manner. Furthermore, it is also conceivable to keep the hard material bodies in a magazine or in a blister. The robot gripping device 34 grips a hard material body 4 from the holding device 36 and transfers it to the welding electrode 26 which, together with the hard material body 4 transferred thereto, is then guided toward the tooth 6a of the saw blade 8 located in the target position. The hard material body 4 is then welded to the tooth back of the tooth 6a in a welding process. After the welding action has ended, the saw blade 8 is moved further in the feed direction 14 by means of the saw blade feed device 12 such that a subsequent tooth 6b can be brought into the target position 16. The robot gripping device 34 then grips a further suitable hard material body 4 from the holding device 36 and transfers it to the welding electrode 26.

The invention claimed is:

1. A method for joining hard material bodies to teeth of a saw blade, each tooth having a tooth face and a tooth back, and the method comprising the following steps:
   bringing a respective tooth of the saw blade into a working region;
   guiding a respective hard material body toward the tooth located in the working region;
   advancing a joining device into the working region;
   joining the hard material body to the tooth located in the working region;
   and withdrawing the joining device out of the working region;
wherein each hard material body is joined to the tooth back of a respective tooth, and wherein the joining device is a welding device having a welding electrode, and a respective hard material body and a respective tooth are joined to one another by welding, and in a step preceding the joining process, at least one welding introduction attachment protruding from a joining surface of the tooth or from a joining surface of the hard material body is formed on the tooth back of each tooth of the saw blade or on each hard material body, the welding introduction attachment melts when a welding pulse is introduced, and each hard material body is ground to its final shape in a step preceding the joining process, wherein the tooth back is formed on the side of the tooth facing away from a cutting direction of the saw blade, and the hard material body is joined only to the side of the tooth facing away from the cutting direction.

2. The method according to claim 1, characterized in that the hard material body is coated in a further step preceding the joining process.

3. The method according to claim 1, characterized in that guiding a respective hard material body toward the tooth located in the working region comprises supplying and transferring a respective hard material body to the joining device by means of a supply device.

4. The method according to claim 3, characterized in that supplying and transferring the hard material body to the joining device by means of the supply device comprises gripping a respective hard material body by means of a robot gripping device.

5. An apparatus for joining hard material bodies to teeth of a saw blade, each tooth having a tooth face and a tooth back, comprising a saw blade feed device for moving the saw blade in a feed direction such that a respective tooth of the saw blade is brought into a working region of the apparatus; a joining device is advanced into the working region and withdrawn again out of the working region, wherein the joining device is designed to join each hard material body to the tooth back of a respective tooth, wherein the joining device is a welding device having a welding electrode, and a respective hard material body and a respective tooth are joined to one another by welding in such that at least one welding introduction attachment protruding from a joining surface of the tooth or from a joining surface of the hard material body formed on the tooth back of each tooth of the saw blade or on each hard material body melts when a welding pulse is introduced, and each hard material body is ground to its final shape in a step preceding the joining process, wherein the tooth back is formed on the side of the tooth facing away from a cutting direction of the saw blade, and the hard material body is joined only to the side of the tooth facing away from the cutting direction.

6. The apparatus according to claim 5, characterized in that the apparatus comprises a supply device for supplying and transferring each hard material body to the joining device.

7. The apparatus according to claim 5, characterized by a device for holding hard material bodies which are fully ground to their final shape and coated and presented in an aligned manner and to which a supply device for supplying and transferring a respective hard material body has access to the joining device.

8. A saw blade comprising teeth and hard material bodies attached to the teeth, each tooth comprising a tooth face and a tooth back, wherein the hard material bodies are attached to the tooth backs of the teeth by welding in such that at least one welding introduction attachment protruding from a joining surface of the tooth or from a joining surface of the hard material body formed on the tooth back of each tooth of the saw blade or on each hard material body was melted when a welding pulse was introduced, and the hard material bodies are ground to their final shape before being joined to the teeth of the saw blade such that a saw blade having fully ground hard material bodies is formed directly after the joining process, wherein the tooth back is formed on the side of the tooth facing away from a cutting direction of the saw blade, and the hard material body is joined only to the side of the tooth facing away from the cutting direction.

9. The saw blade according to claim 8, characterized in that the hard material bodies are coated before being joined to the teeth of the saw blade such that a saw blade having fully ground and coated hard material bodies is formed directly after the joining process.

\* \* \* \* \*